(12) United States Patent
Chou et al.

(10) Patent No.: US 7,557,341 B2
(45) Date of Patent: Jul. 7, 2009

(54) OPTICAL SYSTEM AND PROJECTOR UTILIZING THE SAME

(75) Inventors: Chih-Chang Chou, Taipei County (TW); Jung-Yao Chen, Taoyuan County (TW)

(73) Assignee: BenQ Corporation, Taipei (TW)

( * ) Notice: Subject to any disclaimer, the term of this patent is extended or adjusted under 35 U.S.C. 154(b) by 156 days.

(21) Appl. No.: 11/682,162

(22) Filed: Mar. 5, 2007

(65) Prior Publication Data
US 2007/0252086 A1 Nov. 1, 2007

(30) Foreign Application Priority Data
Apr. 28, 2006 (TW) ............... 95115235 A

(51) Int. Cl.
*G01J 5/02* (2006.01)
*G09G 5/00* (2006.01)

(52) U.S. Cl. .............. 250/235; 250/353; 250/336.1; 353/81; 353/98; 345/156

(58) Field of Classification Search .......... 250/234, 250/353, 336.1; 353/81, 98; 345/156–158
See application file for complete search history.

(56) References Cited

U.S. PATENT DOCUMENTS

| 6,485,147 | B2 | 11/2002 | Liang |
| 6,707,444 | B1 | 3/2004 | Hendriks et al. |
| 7,025,461 | B2 * | 4/2006 | Veligdan et al. ............... 353/37 |
| 7,167,619 | B2 * | 1/2007 | Veligdan et al. ............. 385/120 |
| 7,204,428 | B2 * | 4/2007 | Wilson ....................... 235/494 |
| 7,407,106 | B2 * | 8/2008 | Yee et al. .................... 235/468 |
| 2004/0069934 | A1 | 4/2004 | Hendriks et al. |
| 2005/0047736 | A1 * | 3/2005 | Veligdan et al. ............. 385/120 |
| 2005/0240871 | A1 * | 10/2005 | Wilson ....................... 715/700 |
| 2005/0260986 | A1 * | 11/2005 | Sun et al. .................... 455/433 |
| 2006/0001543 | A1 * | 1/2006 | Raskar et al. ............. 340/572.1 |
| 2006/0007170 | A1 * | 1/2006 | Wilson et al. ............... 345/173 |
| 2006/0066564 | A1 * | 3/2006 | Yee et al. .................... 345/156 |
| 2006/0227099 | A1 * | 10/2006 | Han et al. .................... 345/156 |
| 2006/0244719 | A1 * | 11/2006 | Brigham et al. ............. 345/156 |
| 2006/0289760 | A1 * | 12/2006 | Bathiche ..................... 250/332 |
| 2007/0046625 | A1 * | 3/2007 | Yee ............................ 345/156 |
| 2007/0195270 | A1 * | 8/2007 | Hull et al. ..................... 352/49 |
| 2007/0222953 | A1 * | 9/2007 | Bock et al. .................... 353/98 |
| 2007/0252086 | A1 * | 11/2007 | Chou et al. ................. 250/353 |

* cited by examiner

*Primary Examiner*—John R Lee

(57) ABSTRACT

The optical system comprises a light source, a first optical element, a projecting lens, and an electromagnetic-wave sensor. Light from the light source passes the first optical element and the lens sequentially to reach a screen, and light reflected by the screen passes the lens and reaches the electromagnetic-wave sensor via the first optical element.

18 Claims, 3 Drawing Sheets

OPTICAL SYSTEM AND PROJECTOR UTILIZING THE SAME

BACKGROUND OF THE INVENTION

1. Field of the Invention

The invention relates to an optical system, and in particular relates to an optical system built with electromagnetic-wave sensor.

2. Description of the Related Art

Referring to FIG. 1, when images are projected to a screen 20 by a projector 10, in certain circumstances, some information on the screen 20 must be read, such as a bar code 30. Additional external infrared source 40 and infrared light sensor 50 are needed. It is not convenient to set the external infrared source 40 and infrared light sensor 50.

BRIEF SUMMARY OF THE INVENTION

A preferred embodiment of an optical system of the invention comprises a light source, a first optical element, a lens, and an electromagnetic-wave sensor. Light from the light source passes the first optical element and the lens sequentially to reach a screen, and light reflected by the screen passes the lens and reaches the electromagnetic-wave sensor via the first optical element.

The first optical element is a prism comprising a first surface on which a coating layer is formed, and light from the light source penetrates the first surface, the light reflected by the screen reaches the first surface and is reflected to the electromagnetic-wave sensor by the coating layer.

The first optical element is a mirror comprising a second surface on which a coating layer is formed, and light from the light source reaches the second surface and is reflected to the lens by the coating layer, light reflected by the screen penetrates the second surface to reach the electromagnetic-wave sensor.

The light from the light source comprises visible light and infrared light. The electromagnetic-wave sensor is an infrared light sensor.

The optical system comprises a digital micromirror device act as a light valve reflecting the light from the light source to pass through the first optical element.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

An optical system is described as applying to a projector.

Figure 1:
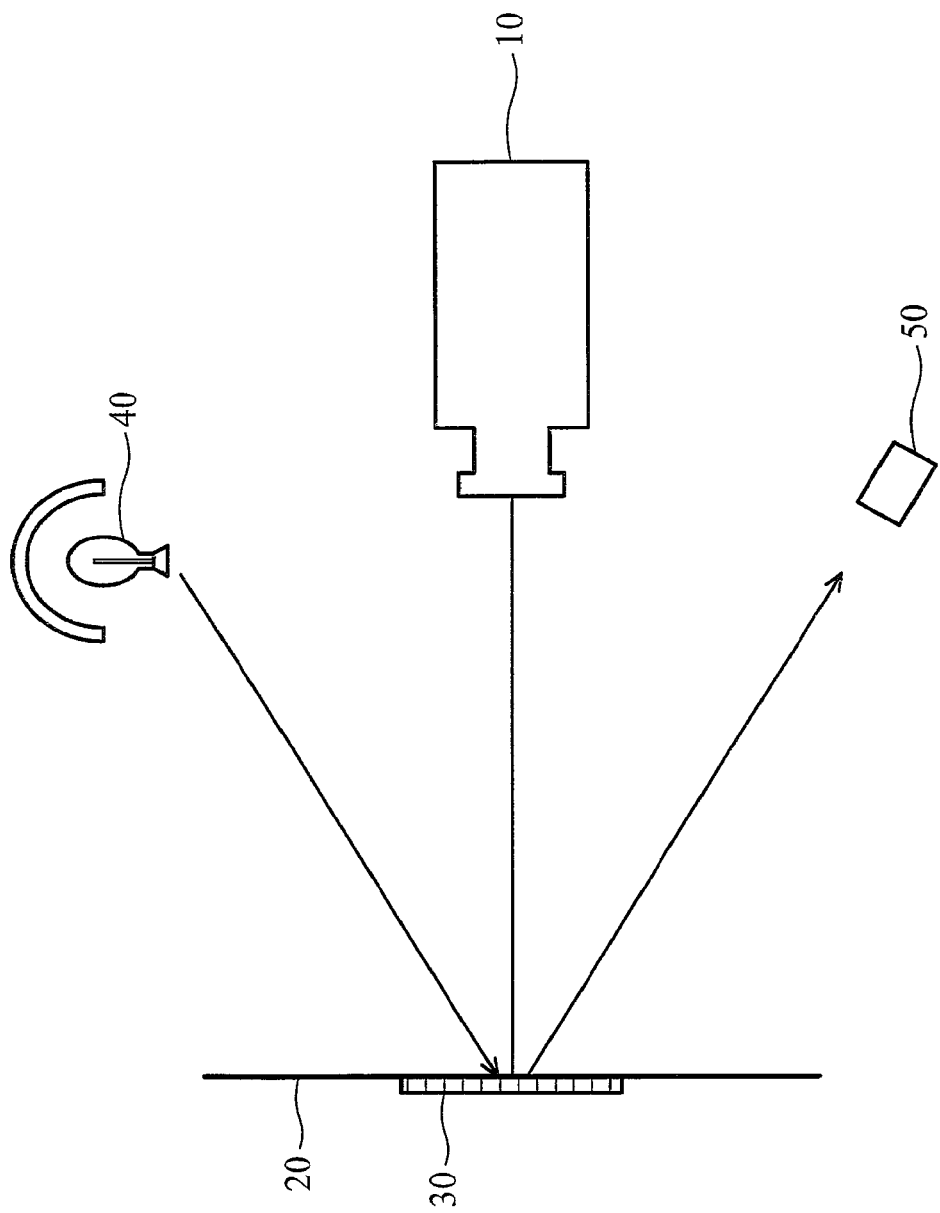
FIG. 1 is a schematic view of a conventional optical system reading data on a screen.
Figure 2:
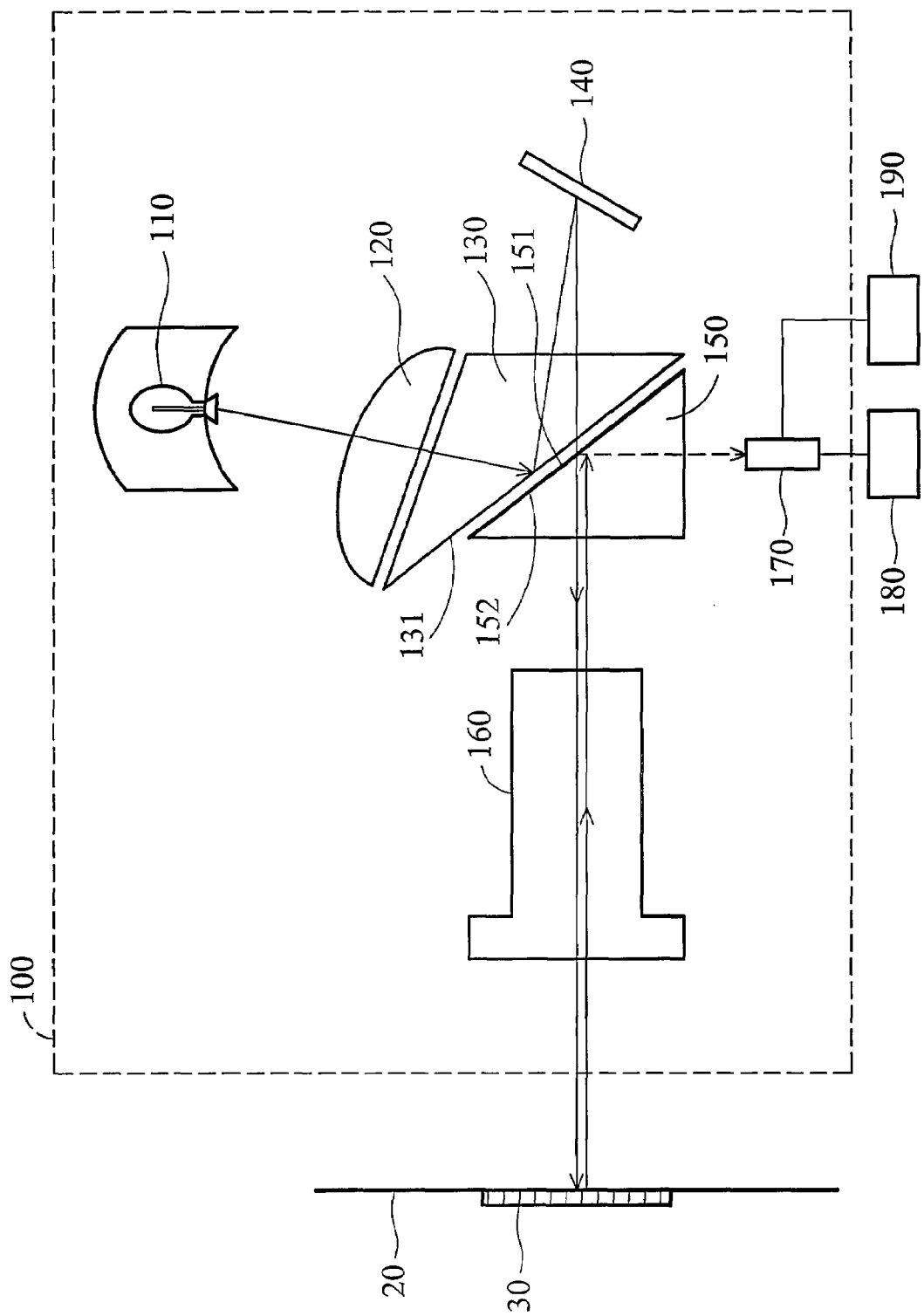
FIG. 2 is a schematic view of an embodiment of an optical system of the invention.

Referring to FIG. 2, an embodiment of a projector 100 of the invention comprises a light source 110, a condensed lens 120, a first prism 130, a digital micromirror device (light valve) 140, a second prism 150, a lens 160 and an infrared light sensor (electromagnetic-wave sensor or invisible light sensor) 170. The second prism 150 comprises a first surface 151 on which a coating layer 152 is formed.

Light from the light source 110 comprises visible light and invisible infrared light. The light from the light source 120 is condensed by the condensed lens 120 and reaches the first prism 130. The light reaching the first prism 130 is reflected by the surface 131 of the first prism 130 and reaches the digital micromirror device 140. The digital micromirror device 140 converts the incident light into a desired image according to an external signal and reflects the incident light to pass through the first prism 130 and penetrate the first surface 151 of the second prism 150 and the coating layer 152 and finally project onto the screen 20.

A predetermined bar code (predetermined pattern) 30 is disposed on a predetermined region of the screen 20. When light reaches the bar code 30, the reflected infrared light of the light from the bar code 30 generates an infrared image of the bar code 30 (image formed by invisible light). The infrared image passes through the lens 160 to reach the first surface 151 of the second prism 150. The coating layer 152 reflects the infrared image to the infrared light sensor 170 near the second prism 150, whereby the infrared light sensor 170 detects the predetermined region of the screen 20 to read information of bar code 30.

The infrared light sensor 170 is connected to a memory 180 and a processor 190. A plurality of predetermined patterns is saved in the memory 180. The processor 190 determines whether the infrared image matches one of the predetermined patterns.

The memory 180 and the processor 190 can be disposed inside the projector 100 or in a personal computer (not shown) connected to the projector 100 by a USB data bus.

If the infrared image matches one of the predetermined patterns, the processor 190 directs the projector 100 or the personal computer to response to the command corresponding to the pattern, for example, play music, display OSD image, adjust brightness/hue or change power point pages.

The infrared light sensor 170 detects the predetermined bar code 30, whereby the processor 190 sends a corresponding command to control the projector 100 or the personal computer.

As the light source 110 is a light bulb of the projector 100 and light from the light source 110 comprises infrared light, no external infrared light source is needed. As the infrared light sensor 170 is built in the projector 100, no additional infrared light sensor is needed.

Figure 3:
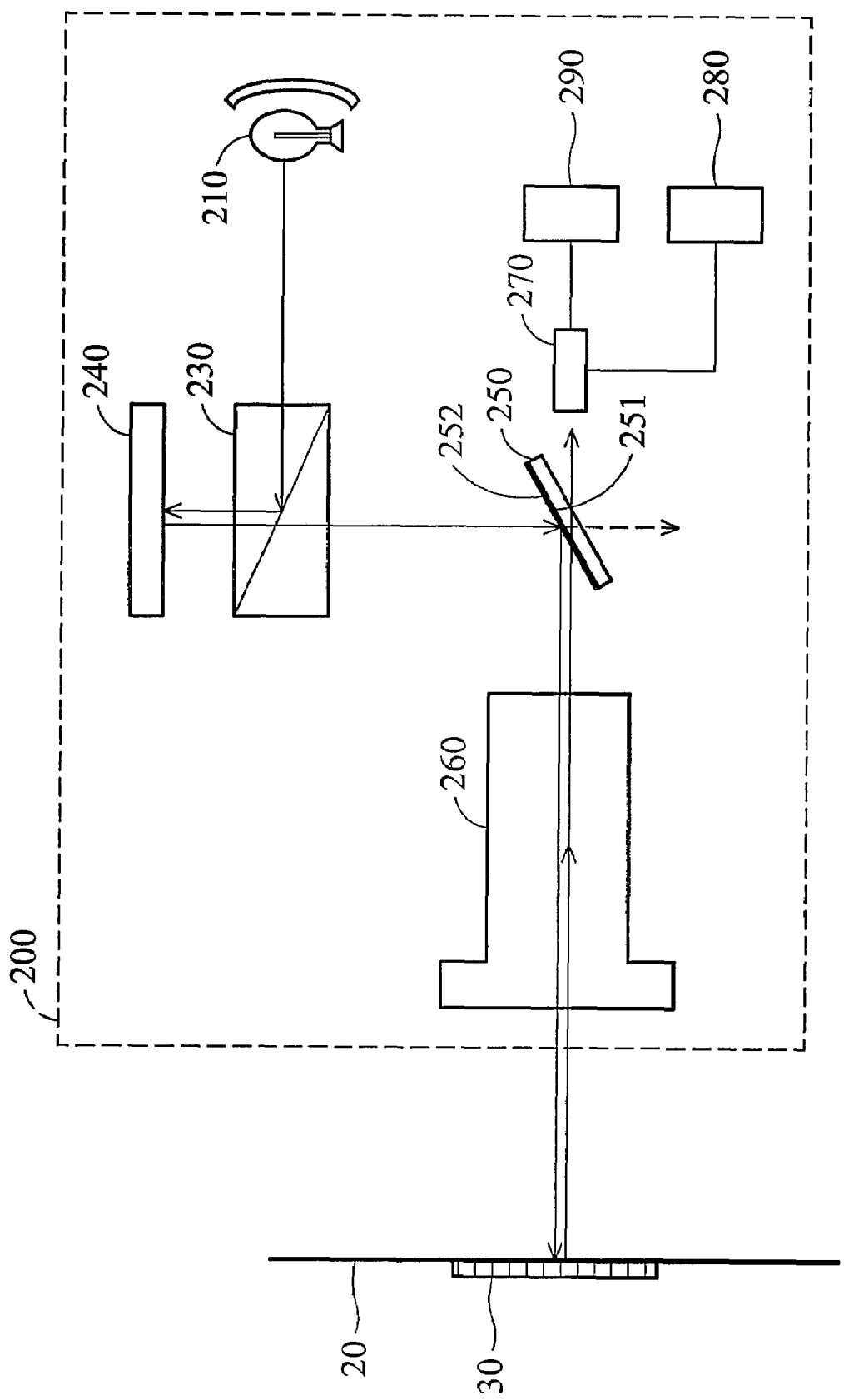
FIG. 3 is a schematic view of another embodiment of an optical system of the invention.

Referring to FIG. 3, another embodiment of an projector 200 of the invention comprises a light source 210, a prism 230, a digital micromirror device (light valve) 240, a mirror (reflector) 250, a lens 260 and an infrared light sensor (electromagnetic-wave sensor or invisible light sensor) 270. The mirror 250 comprises a second surface 251 on which a coating layer 252 is formed.

Light from the light source 210 reaches the prism 230. The light reflected by the prism 230 reaches the digital micromirror device 240. The incident light is reflected by the digital micromirror device 240 to penetrate the prism 230 and reach the second surface 251 of the mirror 250. The incident light is reflected by the coating layer 252 to pass through the lens 260 and projected onto the screen 20.

A predetermined bar code (predetermined pattern) 30 is disposed on a predetermined region of the screen 20. When light reaches the bar code 30, the reflected infrared light of the light from the bar code 30 generates an infrared image of the bar code 30 (image formed by invisible light). The infrared image passes through the lens 260 to reach the second surface 251 of the second prism 250 and penetrate the coating layer 252 and finally reach the infrared light sensor 270, whereby the infrared light sensor 270 detects the predetermined region of the screen 20 to read information of bar code 30.

The infrared light sensor 270 is connected to a memory 280 and a processor 290. A plurality of predetermined patterns is saved in the memory 280. The processor 290 determines whether the infrared image matches one of the predetermined patterns.

The memory 280 and the processor 290 can be disposed inside the projector 200 or in a personal computer (not shown) connected to the projector 200 by a USB data bus.

If the infrared image matches one of the predetermined patterns, the processor 290 drives the projector 200 or the personal computer to response to the command corresponding to the pattern, for example, play music, display OSD image, adjust brightness/hue or change power point pages.

The infrared light sensor 270 detects the predetermined bar code 30, whereby the processor 290 sends a corresponding command to control the projector 200 or the personal computer.

As the light source 210 is a light bulb of the projector 200 and light from the light source 210 comprises infrared light, no external infrared light source is needed. As the infrared light sensor 270 is built in the projector 200, no additional infrared light sensor is needed. In this embodiment, when light reaches the coating layer 252, a part of the light penetrates the coating layer 252 and the rest is reflected by the coating layer 252. The ratio of penetration to reflection can be varied by adjusting thickness and selecting various material. In this embodiment, the penetration part is 50%, the reflection part is also 50%.

The optical system of the invention can detect information on the screen by itself. No additional infrared light source and sensor are needed. The system is simplified and easily used.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical system, comprising
a light source;
a first optical element;
a lens; and
an infrared light sensor,
wherein light comprising visible light and infrared light from the light source passes through the first optical element and the lens sequentially to reach a screen, and light reflected by the screen passes the lens and reaches the infrared light sensor via the first optical element.

2. The optical system as claimed in claim 1, wherein the first optical element is a prism comprising a first surface on which a coating layer is formed, and light from the light source penetrates the first surface, the light reflected by the screen reaches the first surface and is reflected to the electromagnetic-wave sensor by the coating layer.

3. The optical system as claimed in claim 1, wherein the first optical element is a reflector comprising a first surface on which a coating layer is formed, and light from the light source reaches the first surface and is reflected to the lens by the coating layer, light reflected by the screen penetrates the first surface to reach the infrared light sensor.

4. The optical as claimed in claim 1 further comprising a light valve reflecting the light from the light source to pass through the first optical element.

5. A projector, comprising:
a light source;
a light valve;
a first optical element;
a lens; and
an infrared light sensor;
wherein light comprising visible light and infrared light from the light source is reflected by the light valve, passes through the first optical element and the lens sequentially to reach a screen, and light reflected by the screen passes the lens and reaches the infrared light sensor via the first optical element.

6. The projector as claimed in claim 5, wherein the first optical element is a prism comprising a first surface on which a coating layer is formed, and light from the light source penetrates the first surface, the light reflected by the screen reaches the first surface and is reflected to the electromagnetic-wave sensor by the coating layer.

7. The projector as claimed in claim 5, wherein the first optical element is a reflector comprising a first surface on which a coating layer is formed, and light from the light source reaches the first surface and is reflected to the lens by the coating layer, light reflected by the screen penetrates the first surface to reach the infrared light sensor.

8. A projector, comprising:
a light source emitting light comprising visible light and invisible light;
a light valve converting the light from the light source to a first image according to a signal;
a lens projecting the first image to a screen, wherein when the first image is projected to the screen, the invisible light is reflected to form a second image that passes back through the lens;
a coating layer disposed between the light valve and the lens, which reflects the second image formed by the invisible light;
an invisible light sensor near the lens receiving the second image reflected by the coating layer.

9. The projector as claimed in claim 8, wherein a predetermined pattern is disposed on the screen, and the projector further comprises a processor determining whether the second image formed by the invisible light matches the predetermined pattern and a memory in which the predetermined pattern is saved, and the processor and the memory are connected to the invisible light sensor.

10. The projector as claimed in claim 9, wherein a plurality of predetermined patterns are saved in the memory, and the processor determines whether the second image formed by invisible light matches one of the predetermined patterns.

11. The projector as claimed in claim 9, wherein the predetermined pattern corresponds to a command controlling the projector, which is generated by inputting the predetermined pattern.

12. The projector as claimed in claim 9, wherein the projector is connected to an external image source by a data bus, the predetermined pattern corresponds to an external image source command transmitted to the external image source via the data bus, whereby the external image source is controlled by placing the predetermined pattern in front of the projector.

13. The projector as claimed in claim 9, wherein the predetermined pattern is disposed on a predetermined region of the screen detected by the invisible light sensor.

14. A projecting system comprising:
an external image source; and a projector receiving a signal from the external image source and comprising:

a light source emitting light comprising visible light and invisible light;

a light valve converting the light from the light source to a first image according to the signal;

a lens projecting the first image to a screen, wherein when the first image is projected to the screen, the invisible light is reflected to form a second image that passes back through the lens;

a coating layer disposed between the light valve and the lens, which reflects the second image formed by the invisible light;

an invisible light sensor near the lens receiving the second image reflected by the coating layer.

15. The projecting system as claimed in claim 14, wherein a predetermined pattern is disposed on the screen, and the projector further comprises a processor determining whether the second image formed by the invisible light matches the predetermined pattern and a memory in which the predetermined pattern is saved, and the processor and the memory are connected to the invisible light sensor.

16. The projecting system as claimed in claim 15, wherein the predetermined pattern corresponds to a command controlling the projector, which is generated by inputting the predetermined pattern.

17. The projecting system as claimed in claim 15, wherein the projector is connected to the external image source by a data bus, the predetermined pattern corresponds to an external image command transmitted to the external image source via the data bus, whereby the external image source is controlled by placing the predetermined pattern in front of the projecting system.

18. The projecting system as claimed in claim 14, wherein the predetermined pattern is disposed on a predetermined region of the screen detected by the invisible light sensor.

* * * * *